United States Patent [19]

Horikawa et al.

[11] Patent Number: 4,660,668
[45] Date of Patent: Apr. 28, 1987

[54] SELF-PROPELLED AGRICULTURAL MACHINE

[75] Inventors: Tokio Horikawa, Sakai; Mitsuaki Sawai, Habikino; Hisatake Fujioka, Kawachnagano; Nobumasa Kawashima, Kishiwada; Nobuhide Yanagawa, Osaka, all of Japan

[73] Assignee: Kubota Ltd., Osaki, Japan

[21] Appl. No.: 789,766

[22] Filed: Oct. 21, 1985

[30] Foreign Application Priority Data

Jan. 11, 1985 [JP] Japan ................................. 60-3647

[51] Int. Cl.⁴ ............................................. B62D 51/06
[52] U.S. Cl. .................................................. 180/19.1
[58] Field of Search .................. 180/19.1; 172/42, 256

[56] References Cited

U.S. PATENT DOCUMENTS

| 4,139,064 | 2/1979 | Dobberpohl | 180/19.1 |
| 4,262,765 | 4/1981 | Nomura | 180/19.1 |
| 4,567,949 | 2/1986 | Herscher | 180/19.1 |

Primary Examiner—John J. Love
Assistant Examiner—Donn McGiehan
Attorney, Agent, or Firm—Cushman, Darby & Cushman

[57] ABSTRACT

A self-propelled agricultural machine having a control section disposed laterally of a transmission case to control a drive transmission mechanism. A cover for a transmission device for transmitting engine output to the drive transmission mechanism is disposed laterally outwardly of the control section, and a fuel tank is disposed upwardly of the control section. Accordingly, the cover and the fuel tank protect the control section from contact by crop, shrubs and the like.

7 Claims, 4 Drawing Figures

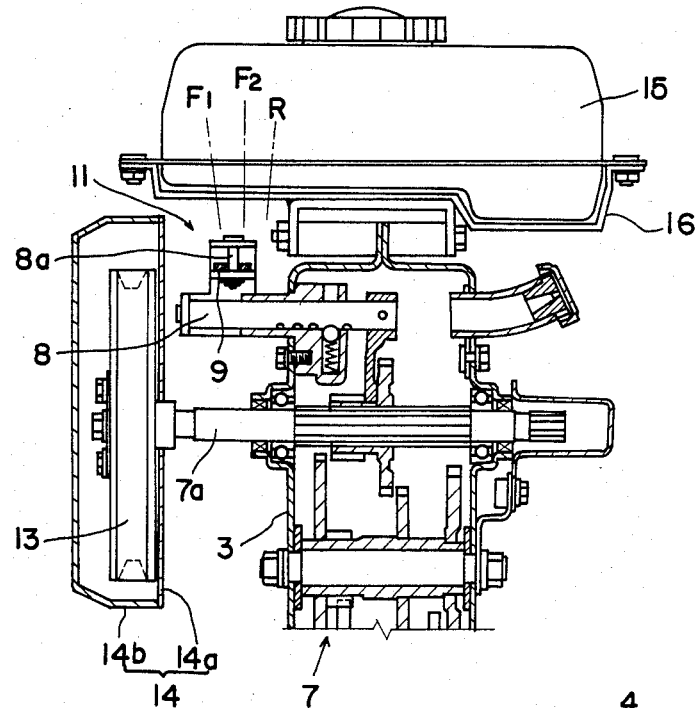
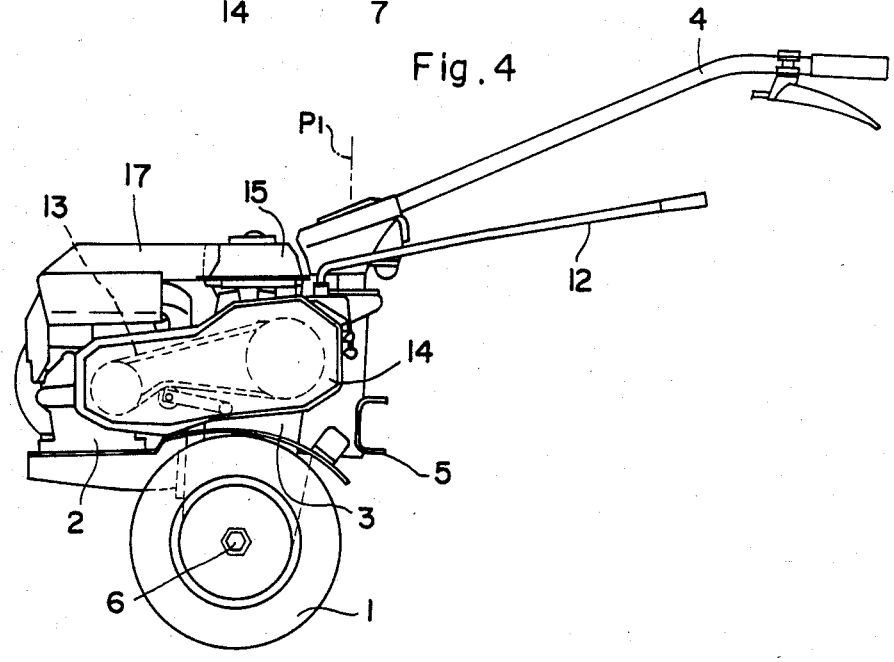

4,660,668

SELF-PROPELLED AGRICULTURAL MACHINE

BACKGROUND OF THE INVENTION

This invention relates to a self-propelled agricultural machine steered by an operator walking behind the machine. The machine comprises a control section disposed laterally of a transmission case to control a drive transmission mechanism.

In known agricultural machines of the type described above, the control section for controlling the drive transmission mechanism is openly exposed to the ambient. Therefore, when the machine is used to operate along rows of crop or near shrubs and trees, leaves and stalks of the crop or branches of the shrubs and trees tend to enter the part of the machine where the control section is mounted and become entangled or caught in the control section. This results in such problems as damage to the crop and an inadvertent switching of the drive transmission mechanism.

SUMMARY OF THE INVENTION

The object of this invention, therefore, is to provide a self-propelled agricultural machine having means to protect the control section for controlling the drive transmission from contact by crops, shrubs, trees and the like.

In order to achieve this object, a self-propelled agricultural machine comprises a transmission case housing a transmission mechanism, transmission means disposed laterally of the transmission case to transmit engine output to the transmission mechanism, cover means having an outer lateral face and covering the transmission means, control means for controlling the transmission mechanism, the control means including motion transmitting means disposed laterally of the transmission case and operatively connected to a manually operable control lever, and a fuel tank including a bottom face, wherein the motion transmitting means is disposed between the cover means and the transmission case and has an outer lateral side thereof covered by the outer lateral face of the cover means, and wherein the fuel tank is mounted on top of the transmission case such that the bottom face of the tank extends above the motion transmitting means.

The motion transmitting means of the control means in the above construction has the outer lateral side thereof covered by the cover of the transmission means and a top portion thereof covered by the fuel tank. Therefore, the motion transmitting means is protected from crops, shrubs, trees and the like.

Moreover, since the cover of the transmission means and the fuel tank are used to cover the motion transmitting means, the construction requires no additional cover exclusively for the motion transmitting means. This feature has the advantage of simplicity and low manufacturing cost of the construction.

The above and other objects and features of the present invention will become apparent from the following description taken in conjunction with the preferred embodiments thereof with reference to the accompanying drawings.

BRIEF DESCRIPTION OF THE DRAWINGS

FIG. 3 is a partly broken away rear view of the control section, and FIG. 4 is a side elevation of a walk-behind type self-propelled agricultural machine.

DESCRIPTION OF THE PREFERRED EMBODIMENTS

Figure 1:
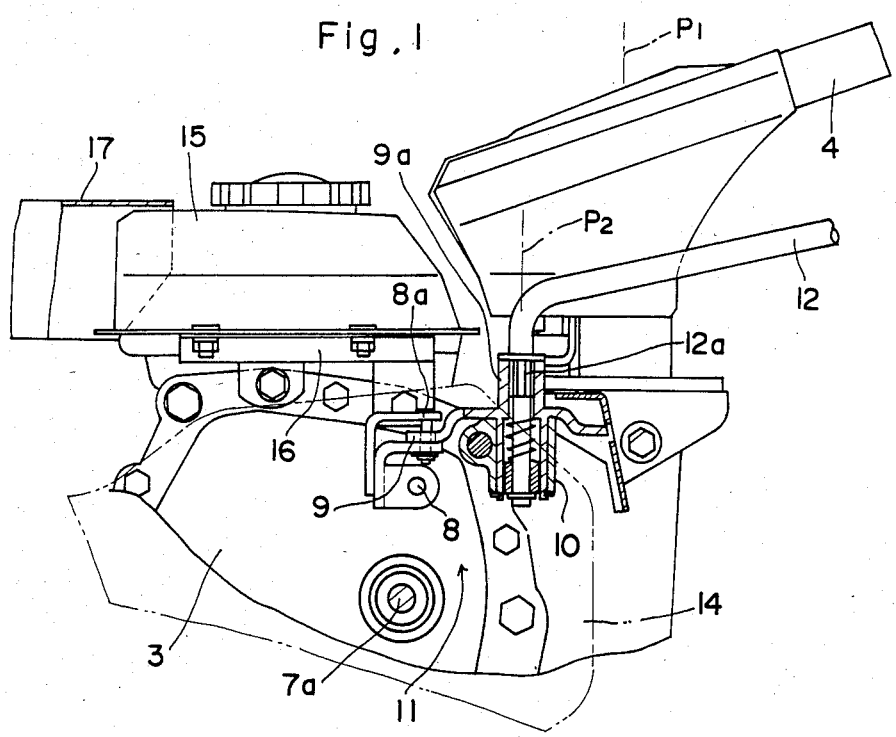
FIG. 1 is a partly broken away side view of a control section for controlling a drive transmission.

The present invention will now be clarified in detail by the following explanation on the preferred embodiments thereof taken in conjunction with the attached drawings.

As shown in FIG. 4, a walk-behind type self-propelled agricultural machine according to one preferred embodiment of the invention includes a transmission case 3 constituting a machine frame. The transmission case 3 is supported by a pair of right and left drive wheels 1. The machine includes an engine 2 disposed forwardly of the transmission case 3, and a steering handle 4 extending upwardly and rearwardly of the transmission case 3. The steering handle 4 is attached to the transmission case 3 to be pivotable on a vertical axis P1 to switch between a forward facing position and a backward facing position. The transmission case 3 carries a hitch 5 on a rear face thereof, and through this hitch a rotary plow or various other working implements may be coupled to the transmission case 3. The rotary plow or other implements may also be coupled to an axle 6.

As shown in FIG. 3, the transmission case 3 houses a drive gear transmission 7 adapted to provide two forward speeds and one backward speed. The gear transmission 7 includes an input shaft 7a projecting laterally outwardly of the transmission case 3. The input shaft 7a is operatively connected to a rear pulley of a belt type transmission device 13 extending forwardly outside and along a lateral wall of the transmission case 3, a front pulley of the transmission device 13 being operatively connected to the engine 2. Thus, output of the engine 2 is transmitted through the belt type transmission device 13 to the gear transmission 7 disposed rearwardly of the engine 2. The input shaft 7a of the gear transmission 7 carries a shifter slidably mounted thereon to selectively engage change speed gears and a reverse gear. The shifter is operable by a shift fork connected to a control rod 8 of a control section 11. The control rod 8 is axially slidable supported by the transmission case 3 and projects laterally outwardly of the transmission case 3. The projecting end of the control rod 8 is connected to a motion transmitting mechanism constituting part of the control section 11. The motion transmitting mechanism includes a member 8a attached to the projecting end of the control rod 8 and carrying an engaging pin, and an engagement member engaged by the engaging pin. Rearwardly of the engagement member there is provided a rotary member 9a attached to the transmission case 3 through a bracket 10 to be rotatable on a vertical sxis P2, and the engagement member is connected to this rotary member 9a. The engagement member and the rotary member 9a in combination constitute a change speed arm 9. The rotary member 9a of the change speed arm 9 is hollow, and a change speed lever 12 has a spline 12a fitted in the hollow rotary member 9 so as to be rotatable therewith. The change speed lever 12 carries a stopper at an extreme end thereof to prevent the lever 12 from pulling out of the rotary member 9a. Accordingly, the speed change lever 12 is switchable between a forward facing position and a backward facing position by drawing the spline upwardly of the rotary member 9a and pivoting the change speed lever 12.

Figure 2:
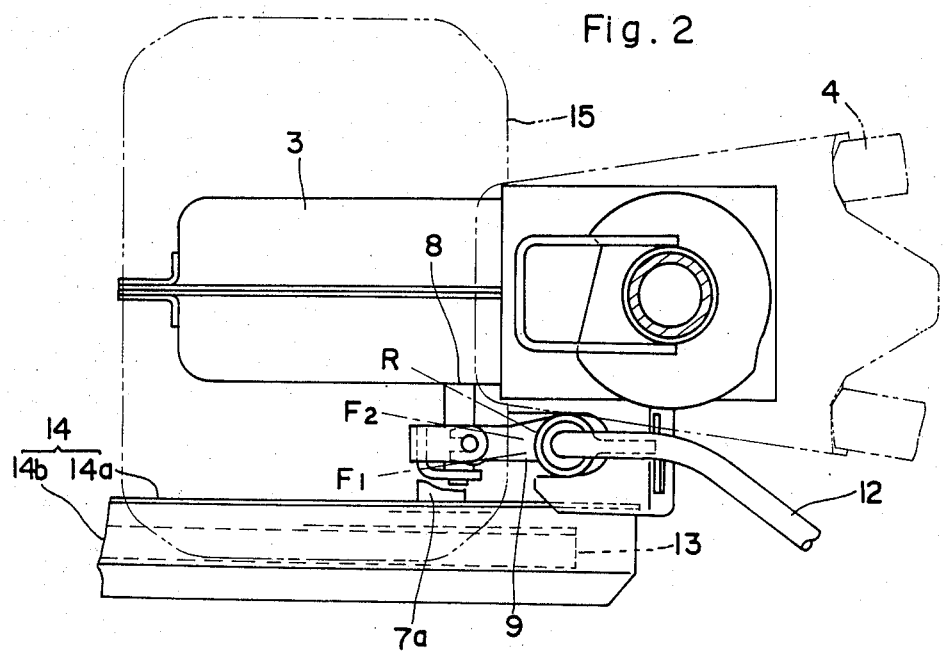
FIG. 2 is a plan view of the control section.

The speed change lever 12 is operatively connected to the shifter for the gear transmission 7 through the control section 11 as described above. Thus the gear transmission is adapted to provide two forward speeds and one backward speed by means of the change speed lever 12 manually operable by an operator. As shown in FIGS. 2 and 3, the gear transmission 7 provides a first forward speed when the change speed lever 12 is operated to bring the change speed arm 9 to a first position F1. The gear transmission 7 provides a second forward speed when the change speed lever 12 is operated to ring the change speed arm 9 to a second position F2. And the gear transmission 7 provides a backward drive when the change speed lever 12 is operated to bring the change speed arm 9 to a third position R.

As shown in FIGS. 1 through 4, the belt type transmission device 13 extending from the engine 2 to the input shaft 7a of the gear transmission is encased in a cover 14 which also covers a lateral side of the control section 11. A fuel tank 15 is mounted on the transmission case 3 through a bracket 16. The fuel tank 15 has a lateral portion located above a rear portion of the cover 14 and a rear portion located forwardly of the rotary member 9a. Thus, the control section 11 has the outer lateral side covered by the cover 14 and a top portion covered by the fuel tank to protect the control rod 8 and change speed arm 9 from contact by crops, shrubs, trees and the like.

It will be understood that the machine may be used to operate along rows of crop or near shrubs and trees without possibility of parts of the crop and other growths contacting and becoming entangled in the control section for controlling the gear transmission, which is achieved by the covering function of the cover and the fuel tank.

Reference number 17 in FIGS. 1 and 4 denotes a bonnet covering the engine 2.

In the described embodiment, the cover 14 for the belt type transmission device comprises an inner cover portion 14a and an outer cover portion 14b. However, this invention is applicable also where the cover 14 consists of the outer cover portion 14b only.

What is claimed is:

1. A self-propelled agricultural machine comprising:
   a transmission case housing a transmission mechanism;
   transmission means disposed laterally of said transmission case to transmit engine output to said transmission mechanism;
   cover means having an outer lateral face and covering said transmission means;
   control means for controlling said transmission mechanism, said control means including motion transmitting means disposed laterally of said transmission case and operatively connected to a manually operable control lever; and
   a fuel tank including a bottom face;
   wherein said motion transmitting means is disposed between said cover means and said transmission case and has an outer lateral side thereof covered by said outer lateral face of said cover means, and wherein said fuel tank is mounted on top of said transmission case such that said bottom face of said tank overhangs in at least one laterally outward direction from said transmission case, the overhanging portion thereof covering an upper region of said motion transmitting means.

2. An agricultural machine as claimed in claim 1 wherein said bottom face of said fuel tank includes a portion disposed above said cover means to define a space laterally of said transmission case for accommodating said motion transmitting means.

3. An agricultural machine as claimed in claim 2 wherein said control means includes a rockable member rotatably supported by said transmission case rearwardly of said fuel tank and operatively connected to said motion transmitting means, said control lever having an end thereof fitted in said rockable member so as to be rockable therewith.

4. An agricultural machine as claimed in claim 3 wherein said transmission means comprises a belt type transmission device.

5. An agricultural machine as claimed in claim 4 wherein said control means includes a control rod axially slidably supported by said transmission case, said control rod having an end thereof carrying a shift fork connected to a shifter for said transmission mechanism and the other end projecting laterally outwardly of said transmission case, and wherein said motion transmitting means includes a member attached to said other end of said control rod and carrying an engaging pin, and an engagement member connected to said rockable member and engaged by said engaging pin.

6. An agricultural machine as claimed in claim 5 wherein said end of said control lever includes a spline fitted in said rockable member and a stopper for retaining said end of said control lever in said rockable member, whereby said control lever is switchable between a forward facing position and a backward facing position by drawing said spline upwardly from said rockable member and pivoting said control lever.

7. An agricultural machine as claimed in claim 6 further comprising a steering handle attached to said transmission case to be pivotable on a vertical axis to switch between a forward facing position and a backward facing position.

* * * * *